US011350772B2

(12) United States Patent
Quezada

(10) Patent No.: US 11,350,772 B2
(45) Date of Patent: Jun. 7, 2022

(54) WALL HOLDER FOR DISPLAY OF BASEBALL-TYPE CAP

(71) Applicant: Irvin Quezada, Parker, CO (US)

(72) Inventor: Irvin Quezada, Parker, CO (US)

( * ) Notice: Subject to any disclaimer, the term of this patent is extended or adjusted under 35 U.S.C. 154(b) by 0 days.

(21) Appl. No.: 16/739,723

(22) Filed: Jan. 10, 2020

(65) Prior Publication Data

US 2020/0146470 A1 May 14, 2020
US 2022/0047101 A9 Feb. 17, 2022

(51) Int. Cl.
*A47F 7/06* (2006.01)
*A47G 25/10* (2006.01)
*B60R 7/10* (2006.01)
*A47G 25/06* (2006.01)
*A47F 5/08* (2006.01)

(52) U.S. Cl.
CPC ............... *A47F 7/06* (2013.01); *A47G 25/10* (2013.01); *B60R 7/10* (2013.01); *A47F 5/08* (2013.01); *A47G 25/0607* (2013.01)

(58) Field of Classification Search
CPC .... A47G 25/06; A47G 25/10; A47G 25/0607; A47G 25/0657; A47B 1/04; A47F 5/08; A47F 7/06; A47C 7/64; B60R 7/10
USPC ............................... 211/30–33; D6/320, 323
See application file for complete search history.

(56) References Cited

U.S. PATENT DOCUMENTS

| 305,861 | A | * | 9/1884 | Taylor | A47G 25/0607 248/303 |
| 314,591 | A | * | 3/1885 | Mack | A47G 25/10 211/32 |
| 371,205 | A | * | 10/1887 | McConnoughay | A47G 25/10 248/304 |
| 435,827 | A | * | 9/1890 | Henshaw | A47G 25/0607 248/305 |
| 1,403,004 | A | * | 1/1922 | Beckers Caspar | A47G 25/10 248/229.16 |
| 1,449,698 | A | * | 3/1923 | Roragen | A47D 7/007 211/106 |
| 1,478,209 | A | * | 12/1923 | Eaton | A47J 45/02 248/305 |
| 2,769,175 | A | * | 11/1956 | Barker, Jr. | A42B 3/14 2/416 |
| 2,797,059 | A | * | 6/1957 | Uhrin | A47G 25/0607 248/303 |
| 2,937,759 | A | * | 5/1960 | Smith | A47G 25/10 211/32 |
| D205,849 | S | * | 9/1966 | Magnuson | D6/323 |
| 3,349,922 | A | * | 10/1967 | Morrison | A47G 25/746 211/113 |

(Continued)

FOREIGN PATENT DOCUMENTS

WO WO2017106927 A1 6/2017

*Primary Examiner* — Devin K Barnett
(74) *Attorney, Agent, or Firm* — Leyendecker S. Lemire

(57) ABSTRACT

A wall mounted baseball-style cap holder (or cap clip) that supports the cap the apex of its crown proximate a button (if the cap is so equipped) is described. The clip comprises a base plate including a flat rear surface, which may have a layer of pressure sensitive adhesive attached thereto, and upper and lower spaced arcuate plate-like protrusions that extend generally orthogonally from the base plate. The holder is configured to be mounted to a wall or other substantially vertical surface typically by way of an adhesive or double sided tape, which may or may not be provided with the holder.

12 Claims, 7 Drawing Sheets

(56) References Cited

U.S. PATENT DOCUMENTS

| | | | | |
|---|---|---|---|---|
| 4,673,153 | A * | 6/1987 | Hilty | A47F 7/06 211/30 |
| 4,805,782 | A * | 2/1989 | Hale | A47G 25/10 211/113 |
| D301,407 | S * | 6/1989 | Boeri | D6/320 |
| 5,002,190 | A * | 3/1991 | Moreland | A47G 25/10 211/106 |
| 5,038,941 | A * | 8/1991 | Bastiaansen | A47F 7/06 211/32 |
| D324,960 | S * | 3/1992 | Rodack | D6/320 |
| 5,137,157 | A * | 8/1992 | Lawson | A47F 7/06 211/32 |
| 5,188,325 | A * | 2/1993 | Hilty | A47F 7/06 211/30 |
| 5,240,123 | A * | 8/1993 | Hawk | A47F 7/06 211/30 |
| 5,303,829 | A | 4/1994 | Kennedy | |
| 5,480,073 | A * | 1/1996 | LaManna | A47F 7/06 206/303 |
| 5,630,516 | A * | 5/1997 | Helman | A47F 7/06 211/32 |
| D403,869 | S * | 1/1999 | Harmon | D6/320 |
| 5,921,403 | A * | 7/1999 | Coffaro | A47F 7/06 211/30 |
| 6,223,910 | B1 * | 5/2001 | Levin | A47F 7/06 211/113 |
| 6,824,027 | B2 * | 11/2004 | Frey | A42B 1/002 223/14 |
| 6,840,411 | B2 * | 1/2005 | Fritz | A47G 25/10 223/24 |
| D549,467 | S * | 8/2007 | Holt | D32/58 |
| 7,665,616 | B1 * | 2/2010 | Hobbie | A47F 7/06 211/31 |
| D650,998 | S * | 12/2011 | Hayashida | D6/320 |
| 9,532,672 | B2 * | 1/2017 | Sandgrund | A47F 5/0043 |
| D778,072 | S * | 2/2017 | Sandgrund | D6/327 |
| 10,104,986 | B2 * | 10/2018 | Schaefer | A47F 7/283 |
| D858,116 | S * | 9/2019 | Wierbicki | D6/323 |
| D882,968 | S * | 5/2020 | Avendano | D6/320 |
| 2001/0032910 | A1 * | 10/2001 | Brueske | B65H 75/366 248/80 |
| 2006/0024144 | A1 * | 2/2006 | Horvath | F16B 13/002 411/30 |
| 2008/0111041 | A1 * | 5/2008 | Drew | A47G 25/10 248/303 |
| 2010/0270440 | A1 * | 10/2010 | Goetz | B65H 75/4478 248/75 |
| 2013/0292523 | A1 * | 11/2013 | Moore | A47G 25/06 248/121 |
| 2018/0344058 | A1 * | 12/2018 | Petner | A47F 7/06 |
| 2019/0261816 | A1 * | 8/2019 | Boyer, Jr. | A47K 5/12 |
| 2019/0298092 | A1 * | 10/2019 | Arrants | A42B 3/06 |
| 2019/0360807 | A1 * | 11/2019 | Chapman | G01C 17/28 |

* cited by examiner

WALL HOLDER FOR DISPLAY OF BASEBALL-TYPE CAP

RELATED APPLICATIONS

This application claims priority to and incorporates fully by reference U.S. Provisional Patent Application 62792211 filed on Jan. 14, 2019, which has the same inventor as the present invention.

BACKGROUND

Many people collect baseball caps and like to display their caps when they are not being worn. A cap can be hung at the adjustment strap or closure by way of a wall-mounted hook or peg; however, the front panels and any indicia thereon face downwardly and are not easily viewed. Alternatively, a cap can be displayed on a shelf; however, the upper peak of the visor may not be readily visible to an observer depending on the height of the shelf. Furthermore, the installation of shelves on a wall can be time consuming and the shelving itself can be relatively expensive. Display cabinets with built in shelving can also be expensive.

Cap holders and cap holding systems have been proposed that hang the hat from near the apex of its crown, but they have been needlessly complex and consequently expensive, or they have been limited in their applicability to caps of different types. Further, these prior art systems often only hold the hat in a single position not permitting a user to rotate or adjust the position of the hat as desired to maximize the display of pertinent indicia.

DETAILED DESCRIPTION

Figure 1:
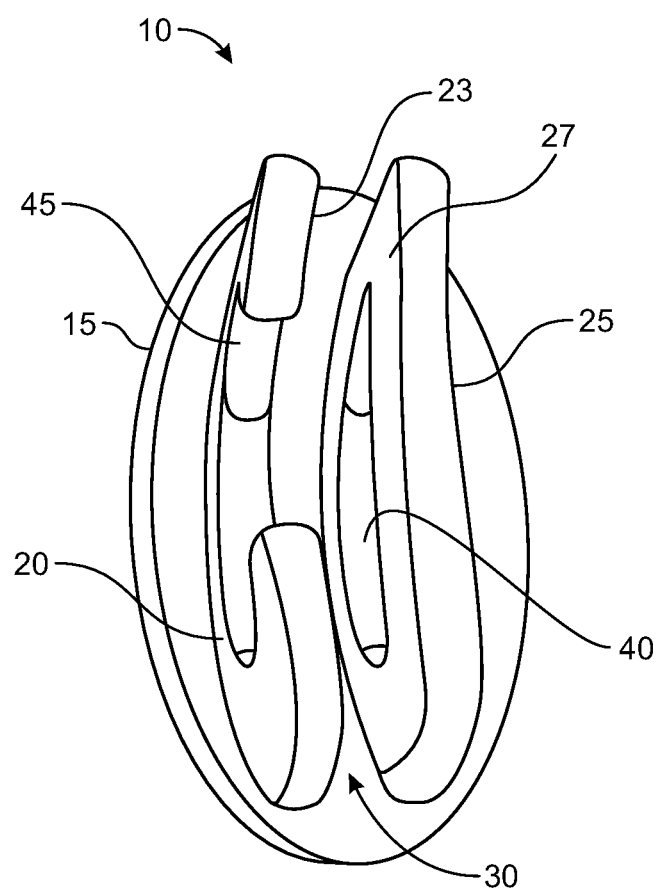
FIG. 1 is a perspective front view of a cap clip/holder according to an embodiment of the present invention.

Embodiments of the present invention comprise a wall mounted baseball-style cap holder (or cap clip) that supports the cap at the apex of its crown proximate a cap button (if the cap is so equipped). The clip comprises a base plate including a flat rear surface, which may have a layer of pressure sensitive adhesive attached thereto, and upper and lower spaced arcuate plate-like protrusions that extend generally orthogonally from the base plate. The upper protrusion can comprise two prongs that define a slot in which the button of the cap can be received. The holder is configured to be mounted to a wall or other substantially vertical surface typically by way of an adhesive or double-sided tape, which may or may not be provided with the holder.

To facilitate display of a cap using embodiments of the holder, the rear panels of the cap's crown and the associated closure/strap are collapsed and folded inwardly against the front panels of the crown. This creates a rear edge in which an apex of the cap abuts the edge. The cap at the edge is then slid into the space between the upper and lower arcuate plates. Typically, the folded over crown is about as thick as distance between the upper and lower plates thereby providing a snug fit. If the hat includes a button, the button is slid into the slot. The back of the slot typically has a width about twice the diameter of the button allowing the positioning of the hat to be adjusted left and right with the button moving within the slot.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The terms "approximately" and "substantially" as used in this specification and appended claims, refers to plus or minus 10% of the value given.

The terms "about" and "generally" as used in this specification and appended claims, refers to plus or minus 20% of the value given.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

The terms "clip" and "holder" are used interchangeably herein in referring to embodiments of the present invention.

The terms "cap" and "hat" are also used interchangeably herein referring to a baseball-style cap that can be utilized with embodiments of the present invention.

An Embodiment of Wall-Mounted Cap Clip for Baseball-Style Caps

Figure 2:
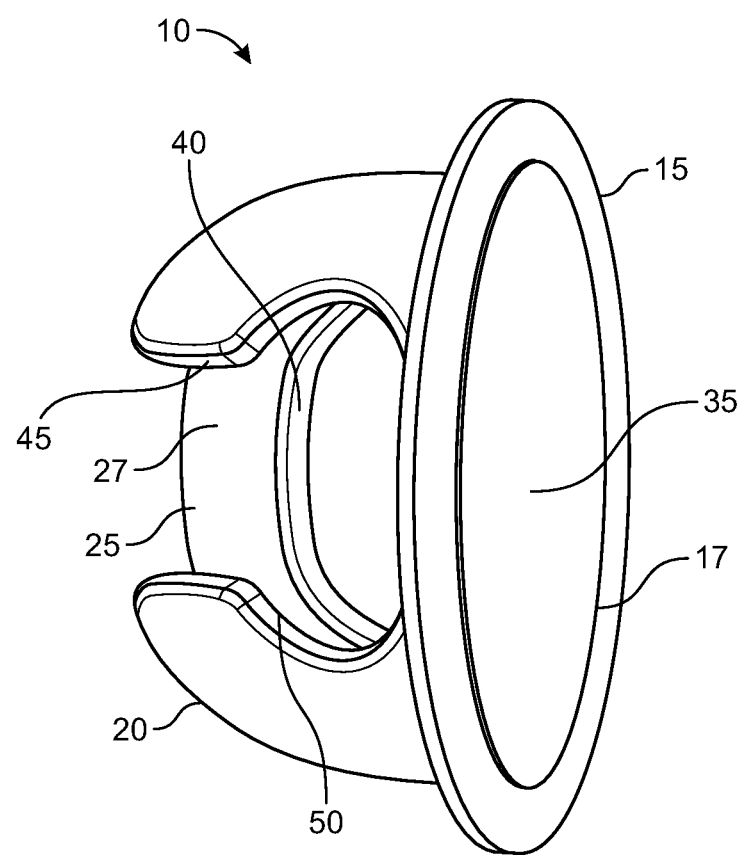
FIG. 2 is a perspective bottom back view of the cap clip/holder according to an embodiment of the present invention.
Figure 3:
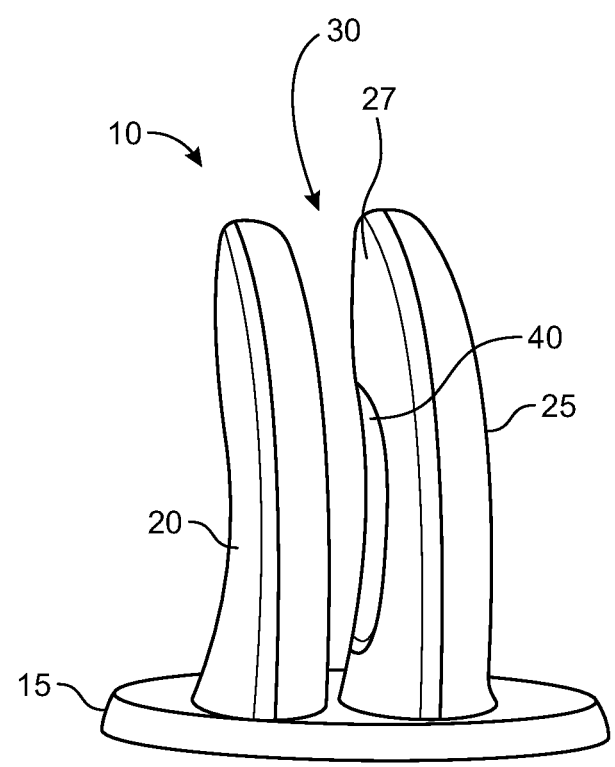
FIG. 3 is a perspective side view of the cap clip/holder according to an embodiment of the present invention.
Figure 4:
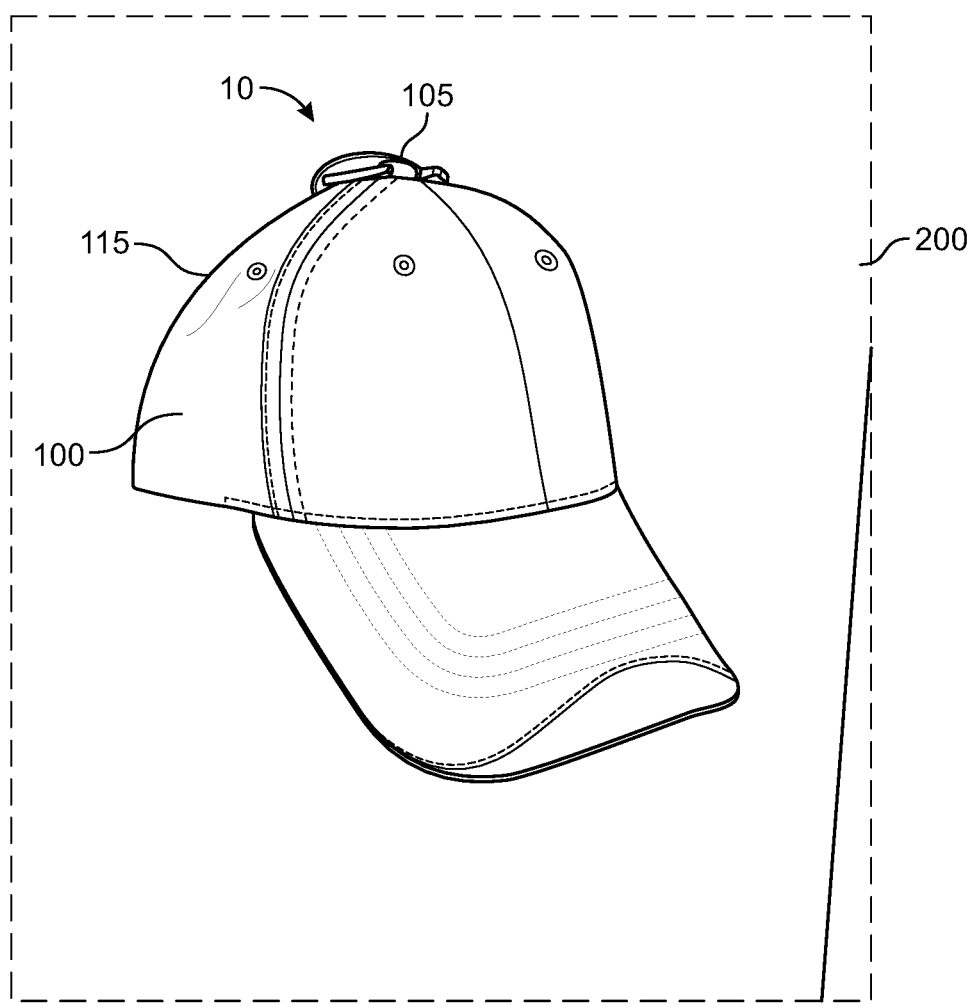
FIG. 4 is a perspective view showing the cap clip mounted to a wall with a baseball-style cap received therein according to an embodiment of the present invention.
Figure 5:
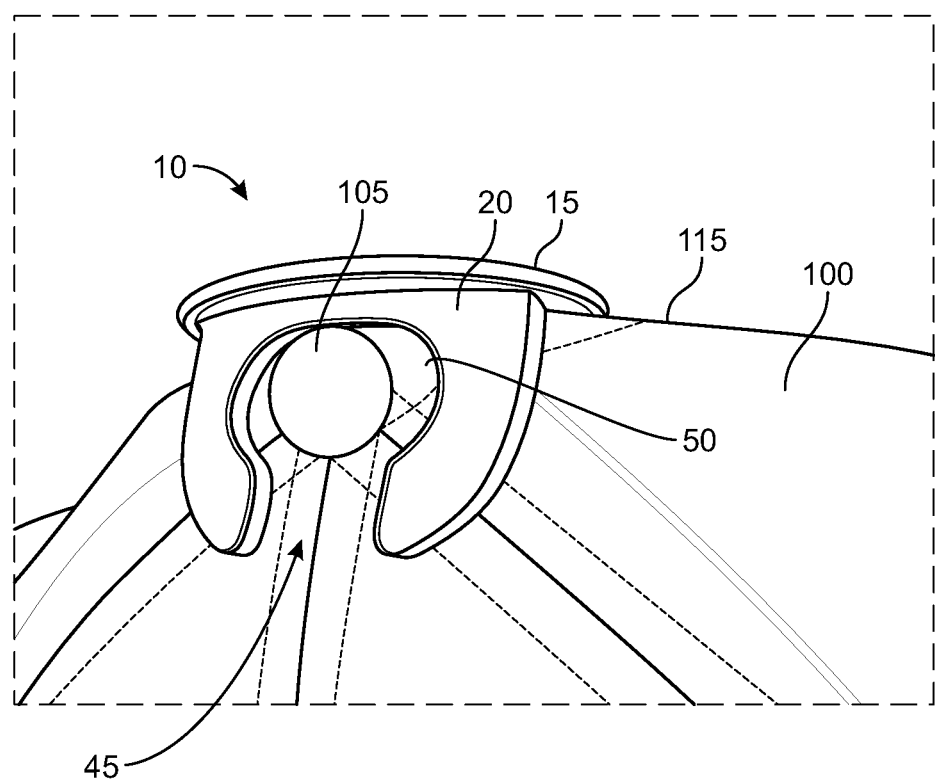
FIG. 5 is a close up perspective top view of a baseball-style cap secured into the cap clip according to an embodiment of the present invention.

FIGS. 1-3 show various views of an embodiment of a cap clip 10. FIG. 4 shows the clip mounted to a wall and a baseball-style cap 100 received therein. FIGS. 4 & 5 illustrate the attachment of a cap to the cap clip.

The illustrated cap clip 10 is comprised of a single unitary piece (excepting any adhesive strip/pad if so equipped) that is typically, although not necessarily unitarily fabricated of a plastic material. The clip is can be injection molded, 3D printed or produced by any suitable manufacturing process. Variations of the clip can also be comprised of other materials, such as wood or metal, or that are comprised of multiple pieces. As mentioned above, the clip comprises (i) a base plate 15 configured for mounting the clip to a wall, (ii) an upper plate-like protrusion 20 that extends generally orthogonally outwardly from the base plate and has an arcuate bottom surface 23, (iii) a lower plate-like protrusion 25 that extends generally orthogonally outwardly from the base plate and has an arcuate top surface 27 wherein the top and bottom surfaces of the respective protrusions are spaced from each other and form an arcuate slot 30.

As shown the base plate 15 is a generally planar oval with a substantially flat back surface 17. The flat surface proves a site for the attachment of adhesive in any suitable form, such as double sided adhesive strip or pad 35. It is appreciated in some variations that the adhesive is pre-attached to the back surface requiring the user to only pull off a protective release layer and then stick the holder to a wall at a desired location. In other variations, a piece of hook and loop material can be secured to the back surface with a complimentary second piece being provided to adhesively secure to a wall. In yet other variations as with the embodiment illustrated in FIG. 7 and discussed below, one or more holes, openings and/or can be provided on or through the base to permit a user to attach the holder to a wall using nails, screws or hooks.

As shown upper and lower protrusions 20 & 25 extend generally orthogonally from the base plate 15. The protrusions are space from each other to form the arcuate slot 30 into which a cap can be received. The bottom surface 23 of the upper protrusion forms an arcuate plane as does the top surface 27 of the lower protrusion. The respective bottom and top surfaces are generally spaced parallel to each other to form the slot. The spacing between the surfaces can vary between embodiments but is preferably about 0.10-0.20" and more preferably about 0.16". The spacing is selected to hold a cap 100 snuggly and securely when it is received therein but also permit easy removal and reinsertion.

The lower protrusion includes an ovular opening 40 (also referred to as a "cutout" even though the cutout may be integrally formed and not cut out of the protrusion). It is appreciated that this cutout, which is provided for aesthetics and to reduce material usage could have any desired shape or even be eliminated in some embodiments.

The upper protrusion includes a button slot 45. The button slot permits a button 105 of a cap 100 to be received therein when the cap is placed in the holder. The slot includes an ovular portion 50 proximate the back of the slot that is wider and significantly longer than the diameter of a typical button permits the user to slide the cap to the right or left in the holder to a position where the hat hangs in the manner he/she desires. In one embodiment the ovular portion is about 1.0" long and 0.63" wide permitting a typical button, which is about 0.5" in diameter, to be moved left and right a total of 0.50".

In the illustrated embodiments, the protrusions 20 & 25 extend outwardly from the base plate 15 about 1.1" and are about 1.6" wide. As indicated the associated bottom and top surfaces 23 & 27 of the respective upper and lower protrusions 20 & 25 are typically curved at a radius of between 8" and 3'. In variations, the length and width of the protrusions can vary as well as the curvature of the top and bottom surfaces. In at least one variation, the top and bottom surface are not curved but substantially straight.

Figure 6:
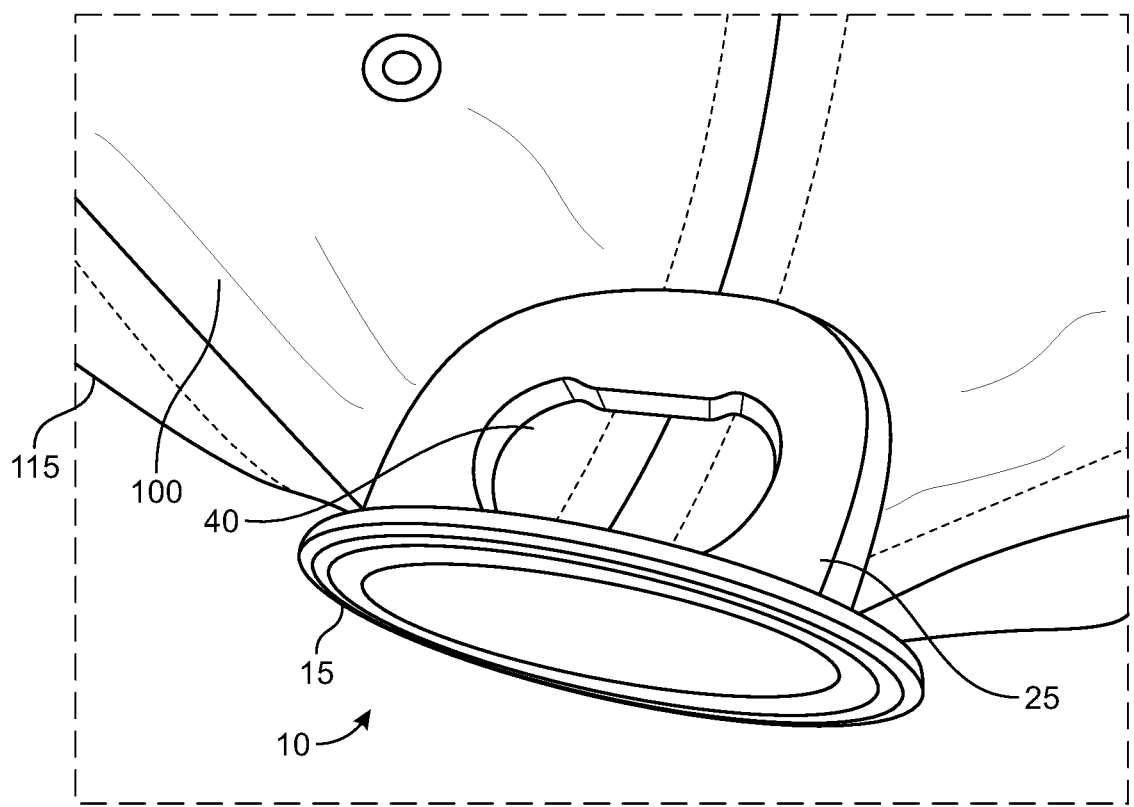
FIG. 6 is a close up perspective bottom view of a baseball-style cap secured into the cap clip according to an embodiment of the present invention.
Figure 7:
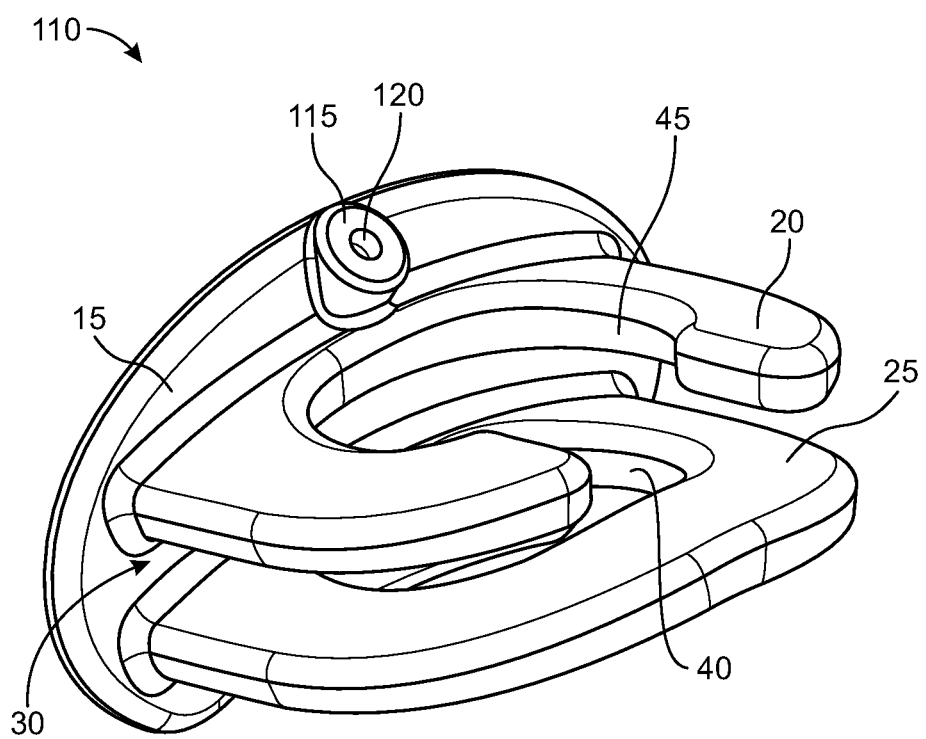
FIG. 7 is a top front perspective view of a cap clip/holder according to another embodiment of the present invention

FIG. 7 is an illustration of another embodiment of the cap clip 110. It is substantially similar to the cap clip 10 illustrated in FIGS. 1-6 except for the addition of an angled boss 115 with a bore 120 extending through the boss and the base plate 15 on to which the boss is molded. The boss and bore permit a user to attach the holder to a wall using a nail, screw or other fastener that is received there through. The angled boss and associated bore dictate the angle off of horizontal that the fastener is received into the wall when the clip is installed thereon. Some variations of this cap clip 110 may also include an adhesive strip 35 attached to the back surface 17 as shown in FIG. 2, but others do not. In yet another variation the adhesive strip or pad is provided separately along with a nail or other fastener so that a user can decide whether to attach the clip to a wall using the fastener, the adhesive strip or both.

A Method of Using Embodiments of the Wall-Mounted Cap Clip for Baseball-Style Caps Prior to using embodiments of the cap clip 10, it is mounted to a wall 200 or other suitable substantially vertical surface, such the surface of a door. In some embodiments the clip is provided with an adhesive strip 35 attached to its back surface 17, and to attach the clip to a wall, the user removes a protective layer from the adhesive strip and gently presses the clip onto the desired location to secure it in place. In other variations, an adhesive, such as double sided tape or a paste adhesive, can be applied to the back surface of the clip and then pressed against the desired vertical surface. In the embodiment of the clip shown in FIG. 7, one or more fastener holes are provided in the base plate 15 through which a screw(s) and/or nail(s) can be received to secure the clip to the wall.

FIGS. 4-6 show the cap clip 10 with a cap 100 attached thereto. FIG. 4 further shows the clip attached to a wall 200.

To facilitate use the crown of the cap 100 is folded such that the rear half is received against the front half. This creates a rear edge 110 proximate the apex of the cap. On many baseball-style caps a button 105 is found at the apex where the various panels that comprise the crown meet.

As shown, the rear edge 110 of the folded over crown of the hat is slid into the arcuate slot 30 formed by the upper and lower protrusions 20 & 25 proximate the cap's apex. The spacing between the protrusions is wide sufficient to permit the hat to be slid into the slot with relative ease but also narrow enough to hold the hat in place as it is displayed. Of significance, the hat's button 105 (if equipped) is slid into the button slot 45 on the upper protrusion and into the ovular cutout portion 50 of the slot. It is to be appreciated other embodiments of the clip are contemplated that do not comprise the slot for use on hats that do not have a button. It is further appreciated that the illustrated embodiment with the slot can be used on caps without buttons as well.

Further, the configuration of the upper protrusion, the button slot and the associated cutaway can vary significantly in other embodiments. For instance in one other embodiment, the upper protrusion may comprise a left generally rectangular tine and a generally rectangular right tine that project from the base and are spaced apart from one another a sufficient distance to allow a button to be slid there between and to permit side to side adjustment of the cap's placement in the holder.

As can be appreciated when a cap is first placed in the holder, it may hang from the holder slightly askew. By moving the cap left or right in the holder a small amount the hat can be positioned in a manner that it hangs properly against the wall. The ovular cutout portion 50 of the button slot 45 permits this adjustment without the button getting in the way.

Variations and Other Embodiments

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A cap holder configured to be mounted on a wall, the cap holder consisting essentially of:
    a base having a flat back surface and a flat front surface, wherein the back surface is configured to receive an adhesive strip to mount the cap holder to the wall;
    an upper protrusion extending outwardly directly from the front surface, the upper protrusion including a first length, a first width, a bottom surface, and a button slot configured to receive a button of a cap therein when the cap is received in the cap holder, the button slot including an ovular portion proximate a back of the button slot, the ovular portion configured to permit the button of the cap to be moved side to side therein; and
    a lower protrusion extending outwardly directly from the front surface, the lower protrusion including a second length, a second width, and a top surface;
    wherein the first length and the second length are substantially the same;
    wherein the first width and the second width are substantially the same;
    the top surface and the bottom surface are spaced apart a distance of about 0.10" to 0.20" to form a cap slot;
    wherein the cap slot is configured to receive and hold the cap therein when a crown of the cap has been folded inwardly proximate an apex of the crown.

2. The cap holder of claim 1, wherein the bottom surface and the top surface are arcuate.

3. The cap holder of claim 1, wherein the bottom surface and the top surface are substantially parallel to each other.

4. The cap holder of claim 1, wherein the top surface and the bottom surface are spaced apart about 0.16".

5. The cap holder of claim 1, wherein the top surface and the bottom surface are both arcuate and substantially parallel to each other.

6. The cap holder of claim 1, wherein the cap holder is a single unitary piece.

7. The cap holder of claim 1, wherein the cap holder is fabricated primarily of plastic.

8. A cap holder for holding a cap, the cap holder is configured to be mounted on a wall, the cap holder consisting essentially of:
    a base having a flat back surface and a flat front surface;
    an adhesive strip attached to the back surface;
    a upper protrusion extending outwardly directly from the front surface, the upper protrusion including a first length, a first width, an arcuate bottom surface, and a button slot configured to receive a button of the cap therein when the cap is received in the cap holder, the button slot including an ovular portion proximate a back of the button slot, the ovular portion configured to permit the button of the cap to be moved side to side therein when the cap is received in the cap holder; and
    a lower protrusion extending outwardly directly from the front surface, the lower protrusion including a second length, a second width, and an arcuate top surface;
    wherein the first length and the second length are substantially the same;
    wherein the first width and the second width are substantially the same;
    the top surface and the bottom surface are substantially parallel and spaced apart a distance of about 0.16" to form a cap slot.

9. The cap holder of claim 8, wherein the base, the upper protrusion, and the lower protrusion define a single unitary piece.

10. The cap holder of claim 8, wherein the cap holder is fabricated primarily of plastic.

11. A method of displaying a cap comprising the steps of:
    providing a cap holder, wherein the cap holder is configured to be mounted on a wall, the cap holder consisting essentially of:
        a base having a flat back surface and a front surface, wherein the back surface is configured to receive an adhesive strip to mount the cap holder on the wall;
        an upper protrusion extending outwardly directly from the front surface, the upper protrusion including a first length, a first width, a bottom surface, and a button slot configured to receive a button of the cap therein when the cap is received in the cap holder, the button slot including an ovular portion proximate a back of the button slot, the ovular portion configured to permit the button of the cap to be moved side to side therein; and
        a lower protrusion extending outwardly directly from the front surface, the lower protrusion including a second length, a second width, and a top surface;
    wherein the first length and the second length are substantially the same;
    wherein the first width and the second width are substantially the same;
        the top surface and the bottom surface are spaced apart a distance of about 0.10" to 0.20" to form a cap slot;
        wherein the cap slot is configured to receive and hold the cap therein when a crown of the cap has been folded inwardly proximate an apex of the crown;
    attaching the cap holder to the wall;
    folding a crown of the cap inwardly proximate the button of the crown to form a rear edge; and
    sliding the rear edge into the cap slot while simultaneously guiding the button of the cap into the button slot.

12. The method of claim 11 further comprising the step of: sliding the cap side to side within the cap slot to adjust a position of the cap.

* * * * *